(12) United States Patent
Fiedler et al.

(10) Patent No.: US 11,327,289 B2
(45) Date of Patent: May 10, 2022

(54) OBSERVATION TELESCOPE

(71) Applicant: Swarovski-Optik KG., Absam (AT)

(72) Inventors: Albert Fiedler, Innsbruck (AT); Martin Kuhn, Rieden (AT)

(73) Assignee: Swarovski-Optik KG

( * ) Notice: Subject to any disclaimer, the term of this patent is extended or adjusted under 35 U.S.C. 154(b) by 27 days.

(21) Appl. No.: 15/930,686

(22) Filed: May 13, 2020

(65) Prior Publication Data

US 2020/0371375 A1 Nov. 26, 2020

(30) Foreign Application Priority Data

May 24, 2019 (AT) .............................. A 50479/2019
Dec. 13, 2019 (AT) .............................. A 51094/2019

(51) Int. Cl.
*G02B 23/02* (2006.01)
*G02B 15/14* (2006.01)
*G02B 25/00* (2006.01)
*G02B 27/64* (2006.01)
*G02B 9/12* (2006.01)

(52) U.S. Cl.
CPC ............... *G02B 23/02* (2013.01); *G02B 9/12* (2013.01); *G02B 15/143101* (2019.08); *G02B 25/001* (2013.01); *G02B 27/646* (2013.01)

(58) Field of Classification Search
CPC .......... G02B 27/646; G02B 15/143101; G02B 25/001; G02B 23/02; G02B 9/12
USPC .................................................. 359/421–422
See application file for complete search history.

(56) References Cited

U.S. PATENT DOCUMENTS

| | | |
|---|---|---|
| 5,757,555 A | 5/1998 | Sato |
| 6,226,122 B1 | 5/2001 | Sugawara |
| 6,226,123 B1 | 5/2001 | Kanai et al. |
| 6,377,399 B1 | 4/2002 | Yanari |
| 9,581,828 B2 | 2/2017 | Tautz et al. |

(Continued)

FOREIGN PATENT DOCUMENTS

| | | |
|---|---|---|
| DE | 102004001481 A1 | 8/2005 |
| JP | 2007156252 A | 6/2007 |

(Continued)

OTHER PUBLICATIONS

European Search Report for Application No. 20175711.9, dated Oct. 20, 2020 2 pages.

*Primary Examiner* — Kristina M Deherrera
(74) *Attorney, Agent, or Firm* — Lerner, David, Littenberg, Krumholz & Mentlik, LLP

(57) ABSTRACT

The invention relates to a telescope optics for a telescopic observational instrument having an objective lens, having a prism erecting system and having an eyepiece lens, wherein an image of an object generated by the objective lens is located between the prism erecting system and the eyepiece lens, and wherein the objective lens, in an order starting from the object side, comprises a first lens group G1 with a positive refractive power, a second lens group G2 with a negative refractive power and a third lens group G3, and wherein the second lens group G2 is adjustable in parallel to an optical axis for focusing, and wherein at least one lens with a negative refractive power of the third lens group G3 is adjustable perpendicularly to the optical axis for changing the position of the image, and wherein the third lens group G3 has a negative refractive power.

20 Claims, 10 Drawing Sheets

(56) References Cited

U.S. PATENT DOCUMENTS

| | | | |
|---|---|---|---|
| 2003/0048534 A1 | 3/2003 | Yoneyama | |
| 2005/0248857 A1 | 11/2005 | Wada | |
| 2010/0284068 A1 | 11/2010 | Yamada | |
| 2011/0019986 A1 | 1/2011 | Maetaki | |
| 2016/0011433 A1 | 1/2016 | Tautz et al. | |
| 2016/0202457 A1 | 7/2016 | Li | |
| 2016/0313570 A1 | 10/2016 | Arai | |
| 2021/0055530 A1* | 2/2021 | Miwa | G02B 27/646 |
| 2021/0149153 A1* | 5/2021 | Fukumoto | G02B 9/12 |

FOREIGN PATENT DOCUMENTS

| | | |
|---|---|---|
| WO | 2008029860 A1 | 3/2008 |
| WO | 2013104657 A1 | 7/2013 |

* cited by examiner

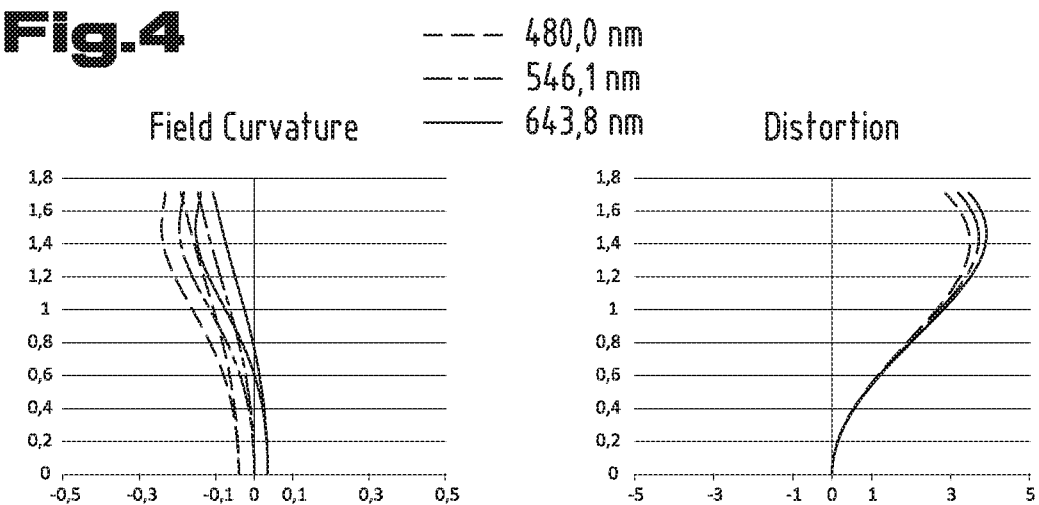
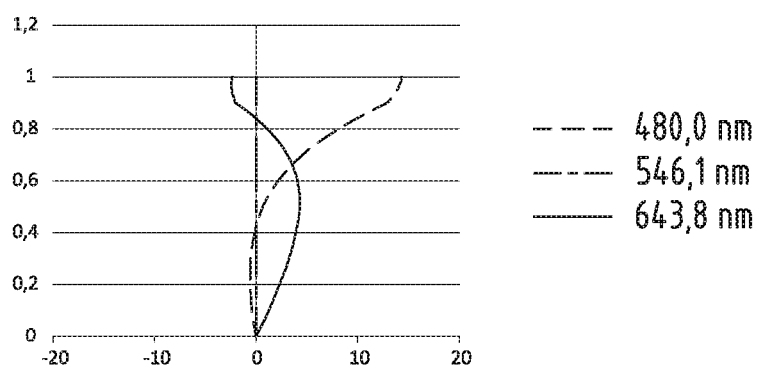
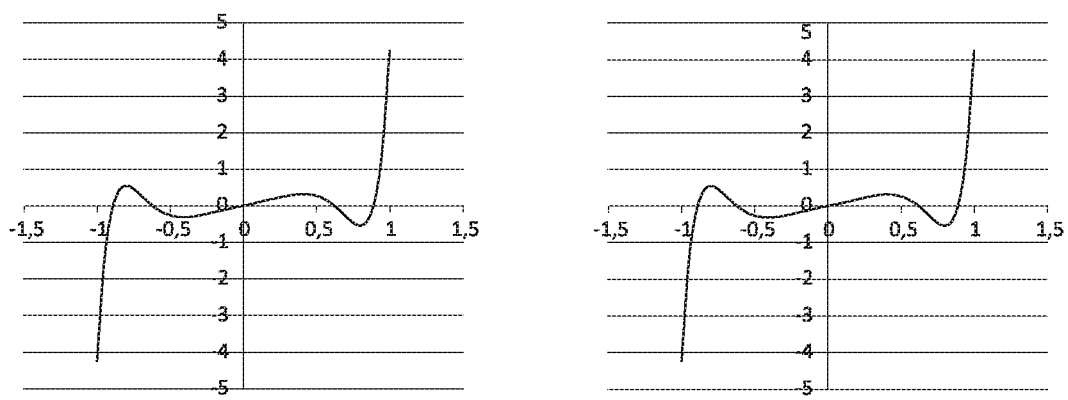
Fig.4
$\lambda = 546{,}1$ nm

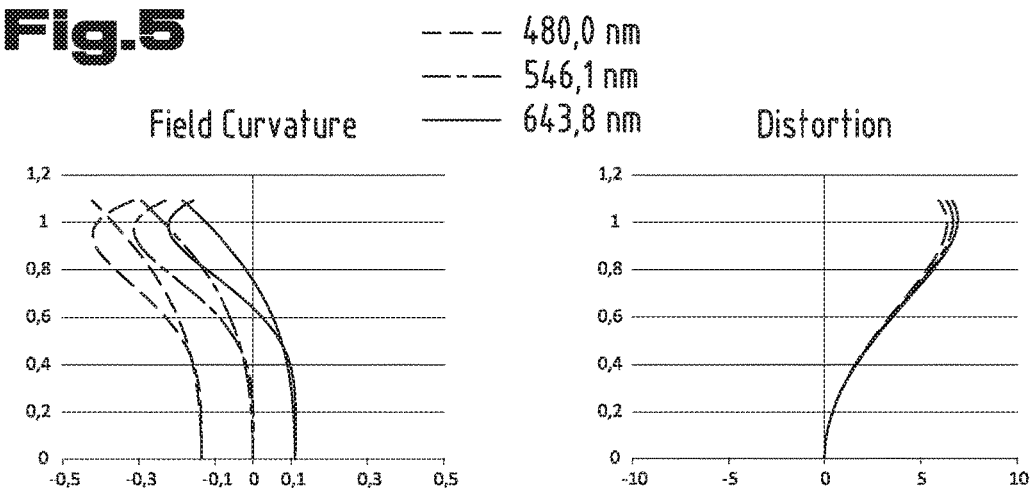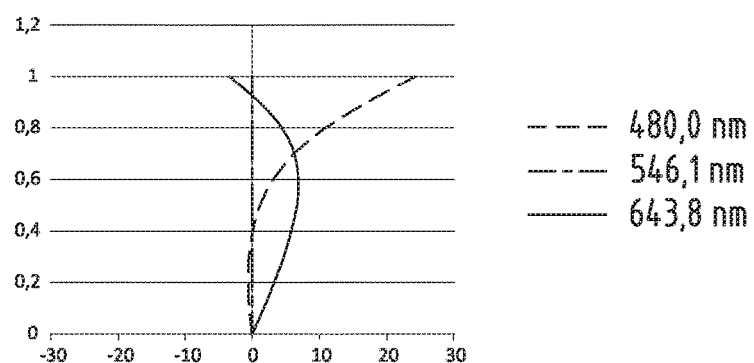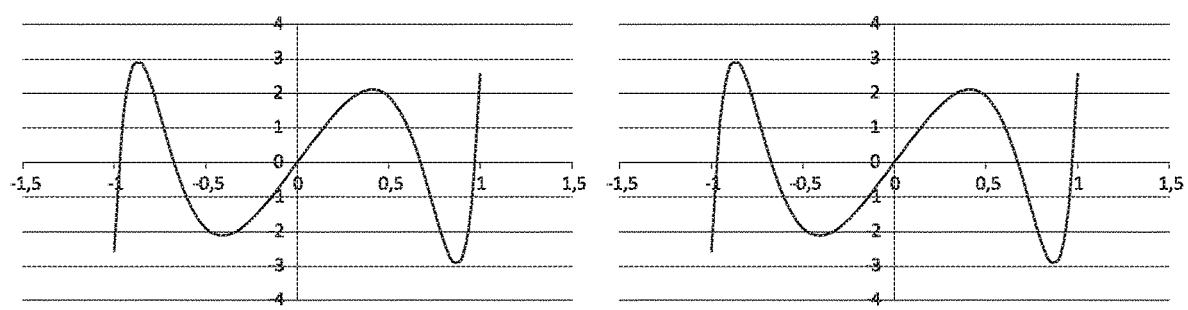

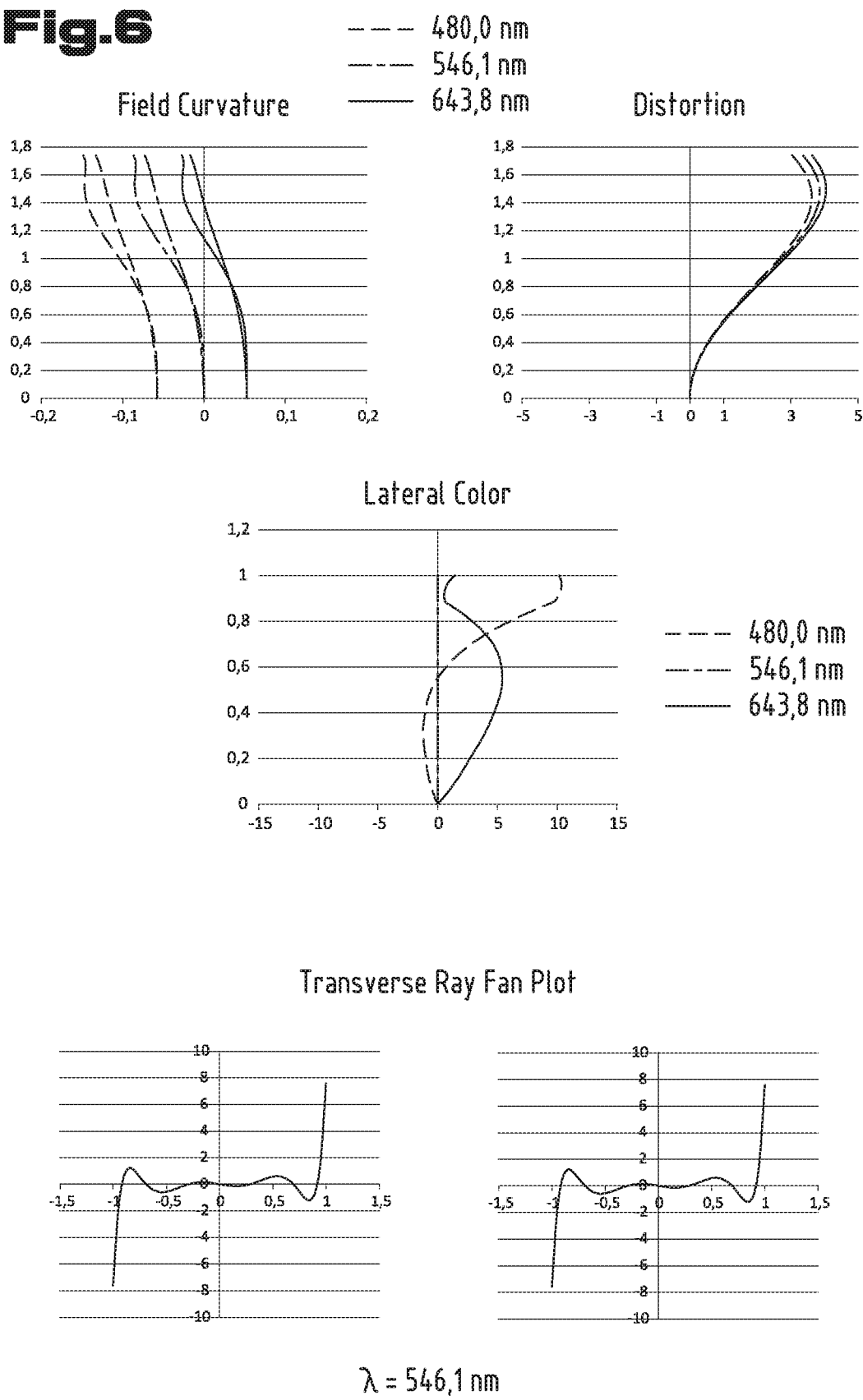

Fig.7
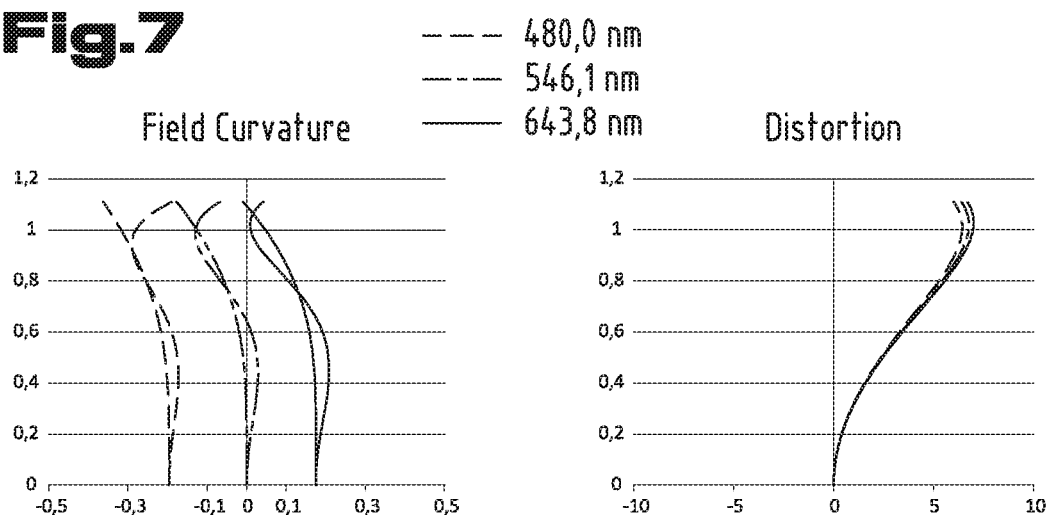
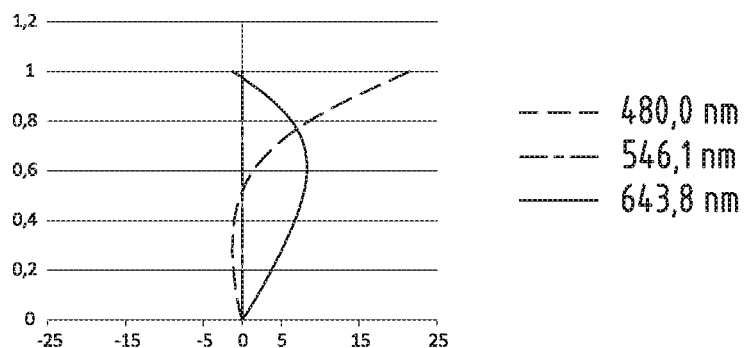
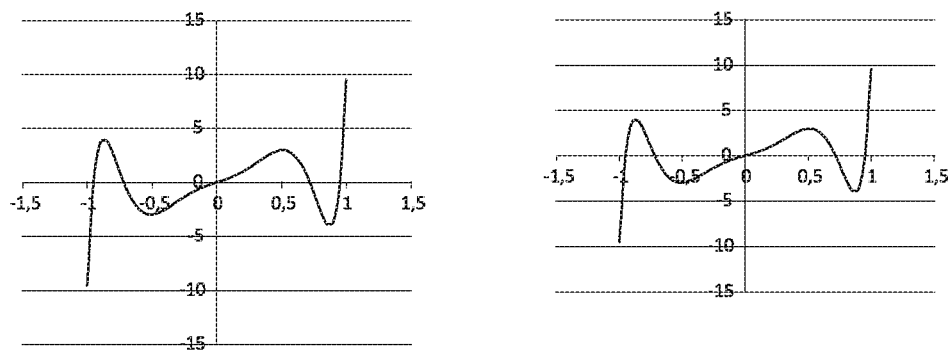
λ = 546,1 nm

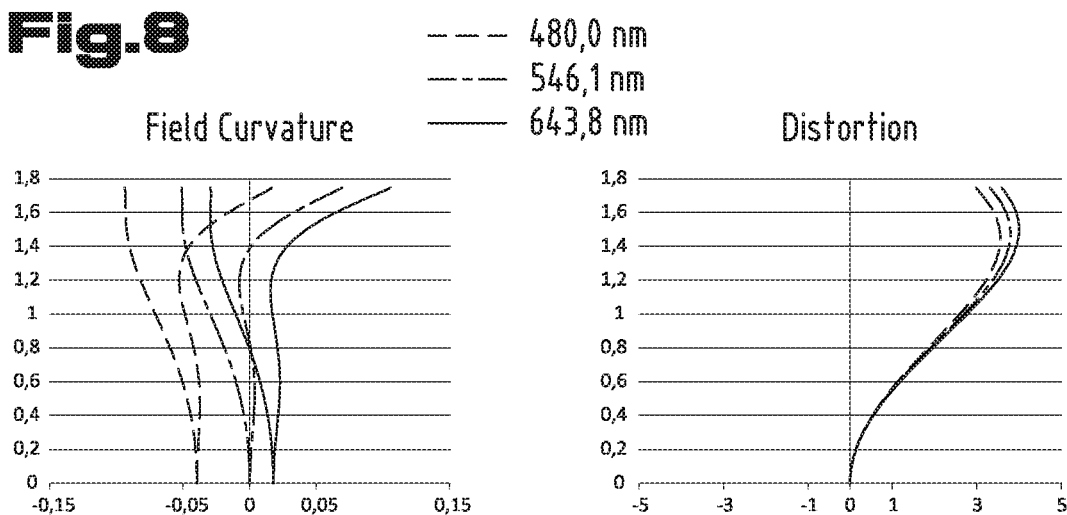
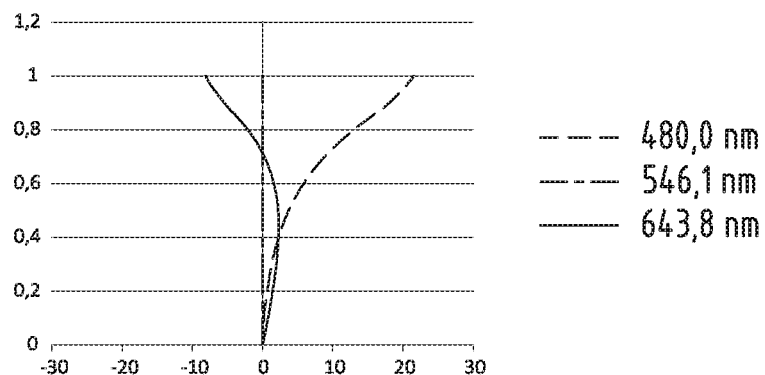
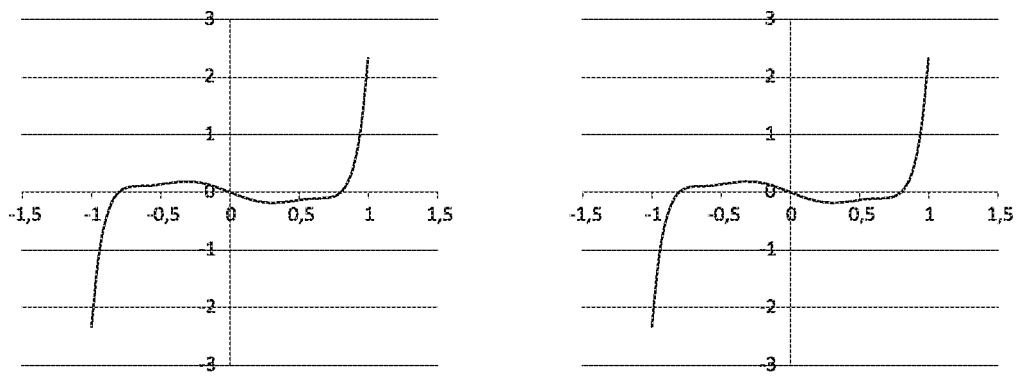
Fig. 8

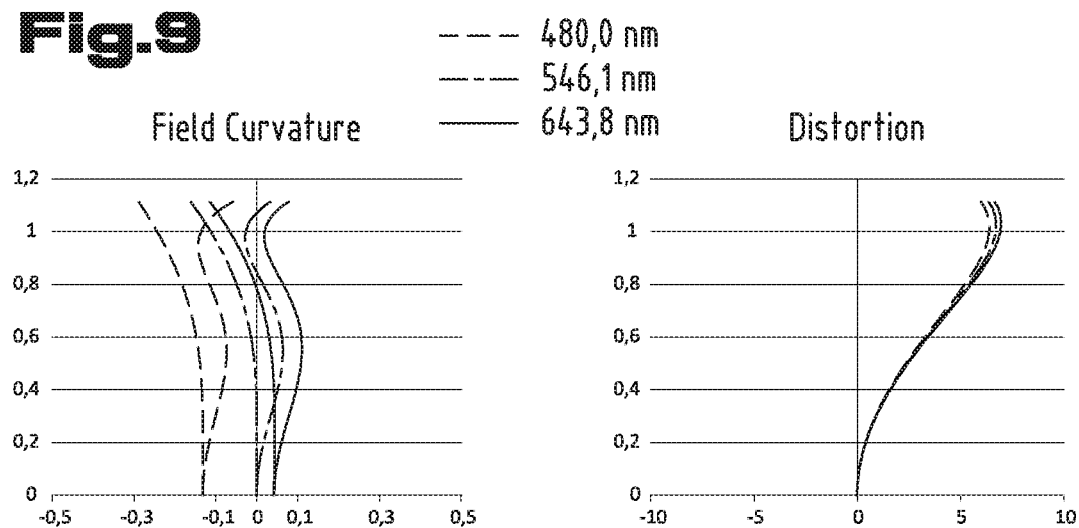
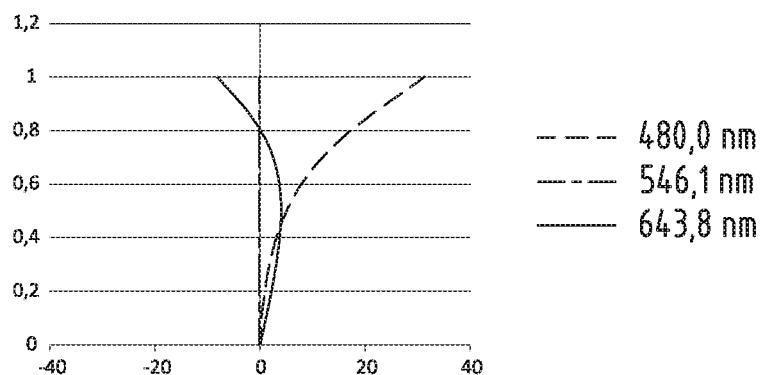
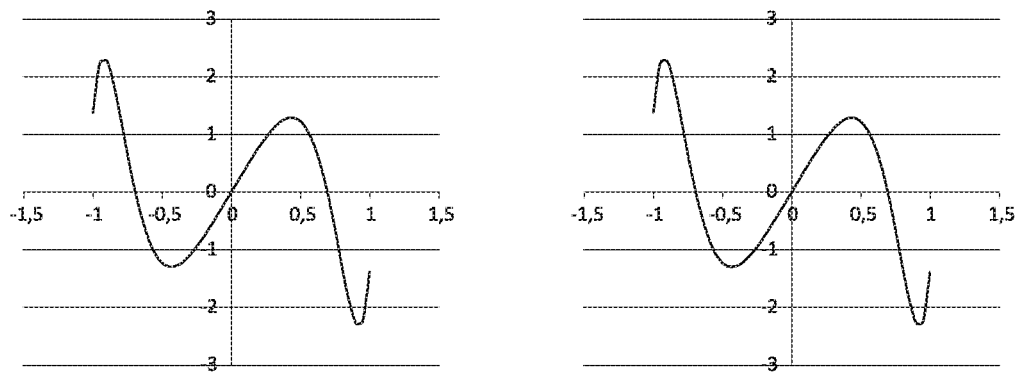

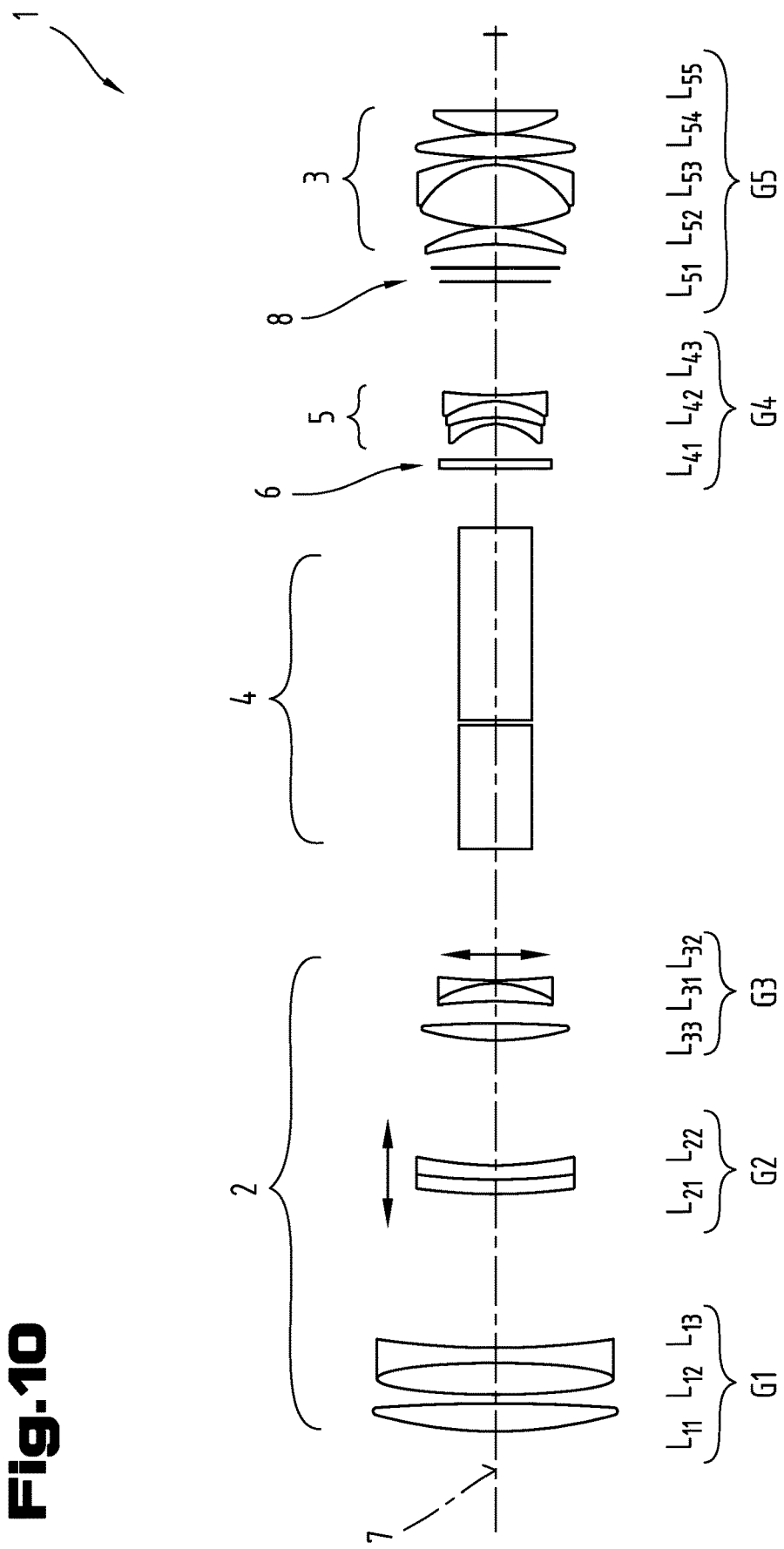

OBSERVATION TELESCOPE

CROSS REFERENCE TO RELATED APPLICATIONS

The present application claims priority from Austrian Patent Application No. A 50479/2019 filed May 24, 2019, and A 51094/2019 filed Dec. 13, 2019, the disclosures of which are hereby incorporated herein by reference.

BACKGROUND OF THE INVENTION

The invention relates to a telescope optics for a telescopic observational instrument.

The effect of a long-range optical device consists in making a distant object appear to an observer at a greater visual angle than is possible without the use of the long-range optical device. Accordingly, the magnification is defined as the ratio of the tangent of the visual angle with an instrument and the tangent of the visual angle without an instrument. Within this meaning, the distant object is depicted in an enlarged manner for the observer's eye by means of the long-range optical device. However, especially for portable long-range optical devices, such as binoculars or observational telescopes, a value of magnification that is too high can be opposed to the usability of the long-range optical device. Freehand holding of the instrument naturally will always be accompanied by wobbling or shaking and will be perceived as motion blurriness by the user. This can be counteracted for example by mounting the long-range optical instrument on a stable tripod. Alternatively, it is also known to equip long-range optical devices with a built-in device for image stabilization. For this purpose, a lens or lens group can be provided in the telescope optics, which is mounted so as to be movable and/or adjustable perpendicularly to the optical axis. Sensor-detected amplitudes and directions of tilting of the optical axis upon shaking deliver data for controlling actuators by means of which the movable lens is displaced in the opposite direction for compensation.

BRIEF SUMMARY OF THE INVENTION

It is the object of the invention to create a telescope optics for a telescopic observational instrument, which ensures high user-friendliness also at high magnifications.

This object is achieved by a telescope optics for a telescopic observational instrument having an objective lens system, having a prism erecting system and having an eyepiece lens system, wherein an image of an object generated by the objective lens system is located between the prism erecting system and the eyepiece lens system, and wherein the objective lens system, in an order starting from the object side, comprises a first lens group G1 with a positive refractive power, a second lens group G2 with a negative refractive power and a third lens group G3 with at least one lens having a negative refractive power, and wherein the second lens group G2 is adjustable in parallel to an optical axis for focusing, and wherein the third lens group G3 is adjustable perpendicularly to the optical axis for change of the position of the image, and wherein at least one lens with a negative refractive power of the third lens group G3 has a negative refractive power. The advantage of this is that thereby, the beam path in the region of the prism erecting system can be designed to be particularly "slim" and elongated. This means that in relation to the diameter of the objective lens, the diameter for the beam path in the region of the prism erecting system only needs to be dimensioned relatively small.

According to a preferred further embodiment of the telescope optics, it can be provided for that the value of a ratio of a specific lateral displacement of the at least one lens with a negative refractive power of the third lens group G3 for image stabilization and a focal length of the third lens group G3 is in a range of between $-52 \times 10^{-3}/°$ and $-25 \times 10^{-3}/°$, wherein the specific lateral displacement of the at least one lens with a negative refractive power of the third lens group G3 for image stabilization is defined by the lateral displacement, relative to the angle unit, of the at least one lens with a negative refractive power of the third lens group G3 with respect to a tilt of the optical axis. This has the advantage that, hence, telescope optics with a high optical quality, i.e. with as few aberrations as possible can be produced.

An embodiment of the telescope optics, according to which a ratio of a focal length of the first lens group G1 to a focal length of the second lens group G2 is in a range between $-0.30$ and $-0.16$, i.e. where $f'(G1)$ and $f'(G2)$ fulfill the condition: $-0.30 < f'(G1)/f'(G2) < -0.16$, is also advantageous.

According to an advantageous further embodiment of the telescope optics, it is provided for that the focal length of the first lens group $f'(G1)$, the focal length of the second lens group $f'(G2)$ and the focal length of the third lens group $f'(G3)$ fulfill the conditions $-1.511 < f'(G1)/f'(G3) < -0.704$ and $2.348 < f'(G2)/f'(G3) < 9.240$.

In a preferred embodiment of the telescope optics, it is provided for that a ratio of a focal length of the third lens group G3 to the focal length of the lens system formed of the first lens group G1 and the second lens group G2 has a value in a range between $-1.17$ and $-0.60$, i.e. fulfills the condition $-1.17 < f'(G3)/f'(G1,G2) < -0.60$.

Preferably, it is also provided for that the first lens group G1 of the objective lens system of the telescope optics, in an order starting from the object side, comprises a first lens L11 with a positive refractive power, a second lens L12 with a positive refractive power and a third Lens L13 with a negative refractive power.

In a further embodiment of the telescope optics, it is provided for that the first lens group G1 of the objective lens system 2, in an order starting from the object side, comprises a biconvex lens L11, a biconvex lens L12 and a biconcave lens L13.

According to an advantageous embodiment of the invention, it can be provided for that the lenses L12 and L13 of the first lens group G1 of the objective lens system form a cemented component.

Moreover, it can be advantageous that the second lens group G2 of the objective lens system comprises a convex surface in the direction of the objective and a concave surface in the direction of the eyepiece.

In the telescope optics, moreover, a design can be provided in which the second lens group G2 of the objective lens system 2, in an order starting from the object side, comprises a cemented component with a biconvex lens L21 and with biconcave lens L22.

Moreover, the second lens group G2 of the objective lens system, in an order starting from the object side, can comprise a cemented component with a convexo-concave lens L21 and with a convexo-concave lens L22.

The at least one lens with a negative refractive power of the third lens group G3 of the objective lens system of the telescope optics, in an order starting from the object side, is advantageously formed as a cemented component with a concavo-convex lens L31 and a biconcave lens L32.

Moreover, the third lens group G3 of the objective lens system, in an order starting from the object side, can comprise a lens L33 with a positive refractive power, preferably formed as a biconvex lens, and the cemented component with a negative refractive power.

An advantageous embodiment of the telescope optics is achieved in that a field lens 5 is formed as a fourth lens group G4, wherein the fourth lens group G4, in an order starting from the object side, comprises a concavo-convex lens L41 and a cemented component of a concavo-convex lens L42 and a biconcave lens L43.

Preferably, the telescope optics is also formed such that the eyepiece lens system 3 comprises a fifth lens group G5, wherein the fifth lens group G5, in an order starting from the object side, comprises a concavo-convex lens L51, a cemented component of a biconvex lens L52 and concavo-convex lens L53, a biconvex lens L54 and a convexo-concave lens L55.

The further embodiment of the telescope optics, according to which the fourth lens group G4 and the lenses L51, L52, L53 and L54 of the fifth lens group G5 are formed to be displaceable in the axial direction, according to the optical axis 7, has the advantage that the total magnification of the telescope is steplessly variable.

For the purpose of better understanding of the invention, it will be elucidated in more detail by means of the figures below.

BRIEF DESCRIPTION OF THE DRAWINGS

These show in a respectively very simplified schematic representation:

FIG. 4 aberrations of the telescope optics at the minimum magnification;

FIG. 5 aberrations of the telescope optics at the maximum magnification;

FIG. 6 aberrations of a second exemplary embodiment of the telescope optics at the minimum magnification;

FIG. 7 aberrations of a second exemplary embodiment of the telescope optics at the maximum magnification;

FIG. 8 aberrations of a third exemplary embodiment of the telescope optics at the minimum magnification;

FIG. 9 aberrations of a third exemplary embodiment of the telescope optics at the maximum magnification;

FIG. 10 a fourth exemplary embodiment of the telescope optics of a telescopic observational instrument.

DETAILED DESCRIPTION

First of all, it is to be noted that in the different embodiments described, equal parts are provided with equal reference numbers and/or equal component designations, where the disclosures contained in the entire description may be analogously transferred to equal parts with equal reference numbers and/or equal component designations. Moreover, the specifications of location, such as at the top, at the bottom, at the side, chosen in the description refer to the directly described and depicted figure and in case of a change of position, these specifications of location are to be analogously transferred to the new position.

Figure 1:
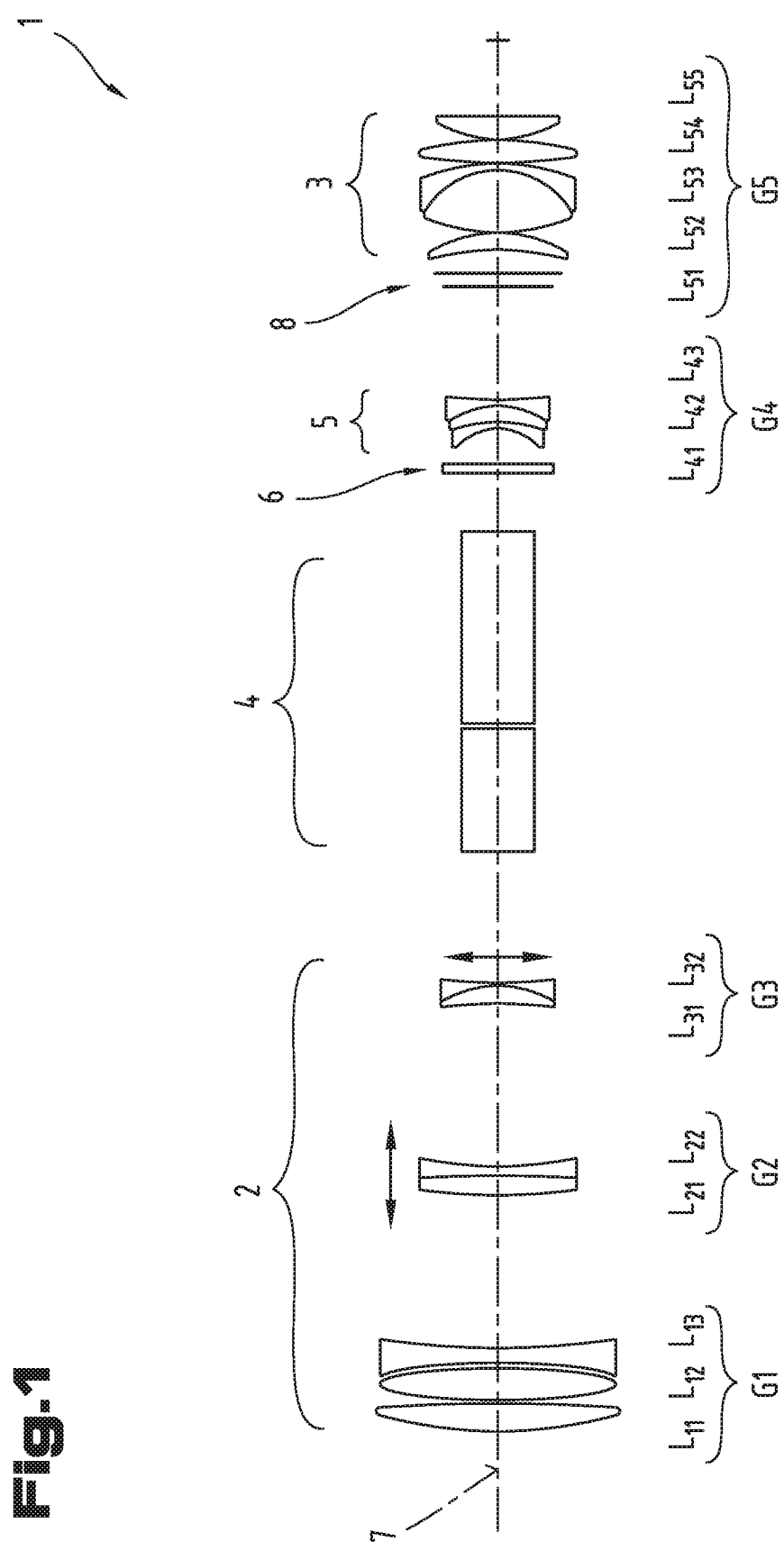
FIG. 1 a first exemplary embodiment of the telescope optics of a telescopic observational instrument.

FIG. 1 shows a preferred exemplary embodiment of the telescope optics 1 of a telescopic observational instrument.

The representation of the components of telescope optics 1 in FIG. 1, as is generally usual, assumes the object side on the left and the observer's side on the right. Accordingly, the telescope optics 1 comprises an objective lens system 2 on the object side and an eyepiece lens system 3 on the observer's side. The objective lens system 2 is followed by a prism erecting system 4 and a field lens 5. It should be explicitly noted for the sake of clarity that where the terms "objective", "eyepiece", "objective lens" or "eyepiece lens" are used in a simplifying manner in the description below, no limitation to just a single lens is intended, but reference can also be made to a system of several lenses. Of course, this also applies to the case of the "field lens 5".

Moreover, a cover glass 6 is drawn in between the prism erecting system 4 and the field lens 5. However, the cover glass 6 is optional and can be provided to provide the telescope with a mechanical interface at which a separation of the telescope into 2 components can be carried out. As can be seen from the representation, the objective lens system 2, the eyepiece lens system 3 and the field lens 5 each comprise lens systems formed of several lenses and/or lens groups. In the selected order—starting out from the object side—, the objective lens system 2 comprises a first lens group G1, a second lens group G2 and a third lens group G3. Continuing this way of designation, thus, the field lens 5 is formed by a fourth lens group G4 and the eyepiece lens system 3 is formed by a fifth lens group G5. The first lens group G1 of the objective lens system 2 comprises the lenses L11, L12 and L13. The individual lenses of the groups G2, G3, G4 and G5 are designated analogously.

The first lens group G1 of the objective lens system 2 has the effect of a collective lens. The second lens group G2 as well as the third lens group G3 of the objective lens system 2 each have the effective of a diverging lens. In this regard, it is moreover provided for that the second lens group G2 of the objective lens system 2 is displaceable in the axial direction, i.e. in the direction of the optical axis 7 of the telescope optics 1. It thus has the function of a focusing lens.

The third lens group G3 of the objective lens system 2 is displaceable perpendicularly to the optical axis 7. Thereby, an image stabilization of an image represented in an image plane 8 can be achieved. Tilting movements of the telescope and/or the optical axis 7 detected by sensors are used to generate a lateral movement of the lens group G3 of the objective lens system 2, by means of which it is achieved that the image represented in the image plane 8 remains at rest relative to a person holding the telescopic observational instrument. This can be illustrated by means of the situation of a telescope aimed at an (infinitely) distant object point with its optical axis 7. The imaginary object point located on the optical axis 7 is imaged for the observer by an axially parallel bundle of rays into an axially parallel bundle of rays emerging from the eyepiece lens system of the telescope. Upon a tilting movement of the telescope, a displacement of location occurs such that the same object point now encloses a non-zero visual angle relative to and with the optical axis 7. This object-side visual angle is magnified by the telescope and the bundle of rays emerging from the eyepiece lens system of the telescope is thus subjected to a corresponding change in direction relative to the unchanged direction towards the object point. To an observer, this change of direction appears as a shaking motion of the magnified image, which becomes more pronounced the higher the value of the magnification of the telescope is. By the lateral displacement of the third lens group G3 of the objective lens system 2, the amplitude of this change in direction can be reduced to almost zero, or at least reduced so much that it is no longer perceived as disturbing.

In the lens group G3 of the objective lens system 2, which has the effect of a diverging lens, it was found out that in case of a clockwise tilting movement of the telescope optics 1, the lens group G3 must be displaced upwards for compensation of the lateral movement of the image in the image plane 8. The telescope optics 1 according to this exemplary embodiment, as is defined by means of its technical data in Table 1 below, allows for tilting in an amplitude range of +/−0.25°. Such amplitude range is typical for hand-held systems. This means that, in case of free holding of a telescopic observational instrument, such as binoculars, in the hands of a person, wobbling or shaking motions in the indicated angular range are to be expected. In this exemplary embodiment, the lateral displacement with respect to the angle unit of the lens group G3 in relation to a tilting of the optical axis 7 has a value of 6.02 mm/° ("specific lateral displacement for image stabilization").

The lens data of the telescope optics 1 according to this exemplary embodiment is listed in Table 1. Therein, "m" means the number of the surface, wherein a count starting at the object-side end of the telescope optics 1 is used. "r" indicates the radius of the of the curvature of the surface and "d" indicates the distance to the next following surface. In this regard, radii of curvature and distances are stated in mm. With regard to the signs of the radii of curvature "r" of the surfaces, the convention otherwise usual in technical optics is used as a basis. This means that the radius is given as the distance from the reference point of the surface, i.e. the point common to the optical axis, to its center of curvature. If this direction (from the reference point of the object towards its center of curvature) is directed just as the direction from the objective to the observer (main direction of propagation of light, z-coordinate), the radius has a positive sign, otherwise the sign is negative. The indication "infinity" for the radius r refers to a planar surface. In the fourth column, "glass", the type of glass is stated in the designations of the catalogs of the company Schott AG.

Moreover, the image plane is also taken into consideration in Table 1, namely as "surface" m=24. Furthermore, by the value of the distance d in the last glass surface, m=33, the interpupillary distance, i.e. the position of the exit pupil, is indicated as well.

TABLE 1

| m | r/mm | d/mm | glass |
|---|------|------|-------|
| 1 | 97.798 | 6.6 | FCD1 |
| 2 | −381.34 | 0.3 | |
| 3 | 107.37 | 8 | FCD1 |
| 4 | −118.76 | 0.995 | |
| 5 | −115.15 | 3.5 | N-KZFS4 |
| 6 | 185.2 | 35.5 | |
| 7 | 140.35 | 4.3 | N-F2 |
| 8 | −807.26 | 2.5 | N-KZFS4 |
| 9 | 97.628 | 37.5 | |
| 10 | −130.19 | 4.2 | N-LASF40 |
| 11 | −25.109 | 1 | N-LASF44 |
| 12 | 266 | 30 | |
| 13 | infinity | 28.498 | N-BAK4 |
| 14 | infinity | 1 | |
| 15 | infinity | 44.882 | N-BAK4 |
| 16 | infinity | 13.6 | |
| 17 | infinity | 2 | N-BK7 |
| 18 | infinity | 8.226 | |

TABLE 1-continued

| m | r/mm | d/mm | glass |
|---|------|------|-------|
| 19 | −13.152 | 1.2 | N-FK5 |
| 20* | −33.999 | 0.22 | |
| 21 | −40.287 | 4 | N-SF6 |
| 22 | −19.66 | 1.2 | N-FK5 |
| 23 | 106.35 | 26.45 | |
| 24 | infinity | 8.2 | |
| 25 | −66.05 | 3.9 | N-LAK33 |
| 26 | −32 | 0.3 | |
| 27 | 45.566 | 14.4 | N-PSK3 |
| 28 | −19.793 | 1.2 | N-SF57 |
| 29 | −56.22 | 0.5 | |
| 30 | 111.14 | 5.2 | N-LAK33 |
| 31 | −77 | 0.5 | |
| 32 | 29.78 | 5 | N-SK5 |
| 33 | 445.58 | 17.7 | |

In this regard, it is moreover provided for that the surface with the number 20, i.e. the boarder surface between the lenses L41 and L42 of the lens group G4, is an aspherical surface. This aspherical surface 20 is rotationally symmetrical with respect to the optical axis 7 and is defined by the relation $$z(r) = c\, r^2 / (1 + \{1 - (1+k)c^2 r^2\}^{1/2})$$

z refers to the coordinate in the direction of the optical axis 7 relative to the vertex (apex) of the surface as a function of the distance r from the optical axis 7, in this regard. The coefficient c (=1/R) is the curvature of the surface at the position of the apex (R is also referred to as apex curvature radius) and k is the Schwarzschild constant ("conic constant"). In this exemplary embodiment, the constant k of the aspherical surface 20 has the value k=−20.

Thus, the telescope optics 1 is in total built-up as follows. The first lens group G1 of the objective lens system 2 comprises the two biconvex lenses L11 and L12 and the biconcave lens L13. The second lens group G2 is formed as a cemented component with the biconvex lens L21 and the biconcave lens L22. The third lens group G3 of the objective lens system 2 also comprises a cemented component, namely with the concavo-convex lens L31 and the biconcave lens L32. The field lens 5 and/or fourth lens group G4 comprises the concavo-convex lens L41 and a cemented component of the concavo-convex lens L42 and the biconcave lens L43. The eyepiece 3 and/or the fifth lens group G5 lastly comprise a lens system with the concavo-convex lens L51, the cemented component of the biconvex lens L52 and the concavo-convex lens L53, the biconvex lens L54 and the convexo-concave lens L55.

In Table 2, the data of the individual lenses and/or the total focal lengths of the respective lens groups are shown. "ne" is the refractive index and "ve" means the Abbe number (v Greek lower case letter Ny). The reference wavelength is the so-called "e-line" with 546 nm. d means the lens thickness and f' the focal length, each in the unit mm.

TABLE 2

| lens/group | ne | ve | d/mm | f/mm |
|------------|-----|-----|------|------|
| L11 | 1.49845 | 81.2 | 6.6 | 156.88 |
| L12 | 1.49845 | 81.2 | 8 | 114.48 |
| L13 | 1.61664 | 44.27 | 3.5 | −114.64 |
| G1 | | | | 143.15 |
| L21 | 1.62408 | 36.16 | 4.3 | 191.92 |
| L22 | 1.61664 | 44.27 | 2.5 | −141.09 |
| G2 | | | | −573.85 |

TABLE 2-continued

| lens/group | ne | ve | d/mm | f/mm |
|---|---|---|---|---|
| L31 | 1.83935 | 37.04 | 4.2 | 36.4 |
| L32 | 1.80832 | 46.25 | 1 | −28.34 |
| G3 | | | | −120.7 |
| L41 | 1.48914 | 70.23 | 1.2 | −34.35 |
| L42 | 1.81266 | 25.16 | 4 | 43.47 |
| L43 | 1.48914 | 70.23 | 1.2 | −33.82 |
| G4 | | | | −27.37 |
| G5 | | | | 20.24 |

The telescope optics 1 has a total magnification of 34.3 times and an angular field of view in object space of 2.18°. Accordingly, an angular field of view in image space of 69.6° is achieved.

Figure 2:
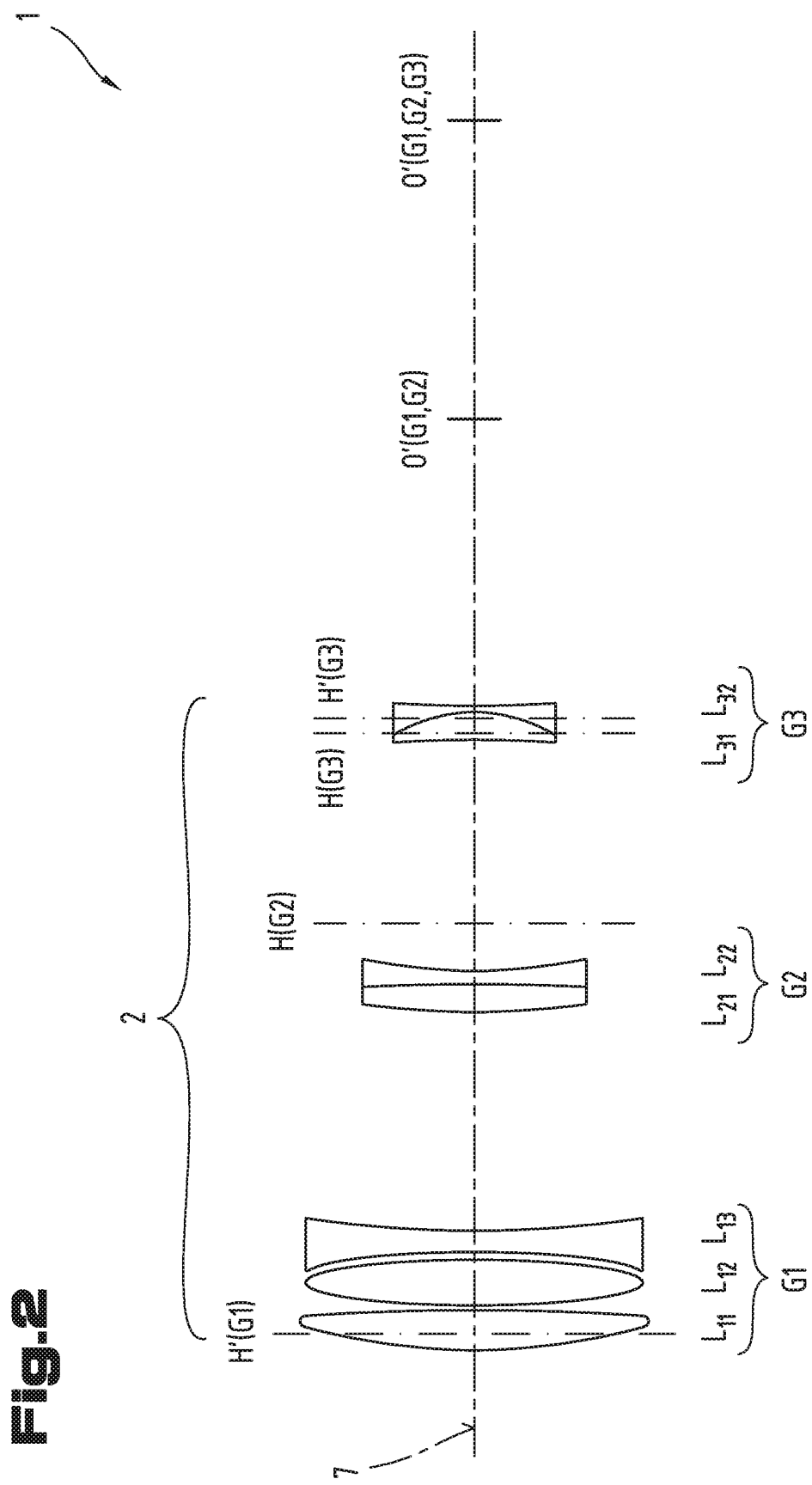
FIG. 2 a lens system of the objective lens system as a detail of the telescope optics according to FIG. 1.

FIG. 2 shows the lens system of the objective lens system 2 as a detail of the telescope optics 1 according to FIG. 1. The value of the lateral displacement of the lens group G3 with respect to the angle unit can be derived from the geometric ratios of the lens groups G1, G2 and G3 according to the representation in FIG. 2. This allows for a comparison of the effect of the lens system formed by all three lens groups, G1, G2 and G3, and a lens system formed only by the first lens group G1 and the second lens group G2 of the objective optics. An infinitely distant object point on the optical axis 7 would be imaged into the eyepiece-end image point O' (G1, G2) under the sole effect of the system of the first lens group G1 and the second lens group G2. On the other hand, the same object point is imaged into the eyepiece-side image point O' (G1, G2, G3) by the combined total effect of all three lens groups G1, G2 and G3. In the common way of designation, the object-end and/or image-end main planes H and/or H' to the lens groups G1, G2 and G3 are drawn in as well. Upon tilting and/or pivoting of the telescope optics 1 relative to a resting coordinate system, the image in O' (G1, G2) is subjected to a lateral displacement with a value of 2.877 mm/°. This corresponds approximately to the arc length corresponding to one degree (1°) on the circumference of a circle whose radius is equal to the value of the focal length f' (G1, G2). By a transverse movement of the lens group G3 (perpendicularly to the optical axis 7), the lateral displacement of the image is to be reduced to almost zero (relative to the resting coordinate system). In addition, however, the imaging effect of the lens group G3 must also be taken into account in so far as this results in an additional increase in the lateral displacement of the image in relation to the magnification dimension of an image from the image plane in O' (G1, G2) to the image plane O' (G1, G2, G3).

The lateral displacement of the lens group G3 for effecting an image stabilization is calculated on the basis of the variables f' (G1, G2)=164.82 mm and the ratios of the distances O' (G1, G2, G3)–H' (G3) to O' (G1, G2)–H (G3):

116.853/58.949×2.877=5.703 mm/°

However, in fact, a slight influence of the lens group G4 as well as aberrations must also be taken into consideration such that practically, the value of 6.02 mm/° already indicated above results.

Figure 3:
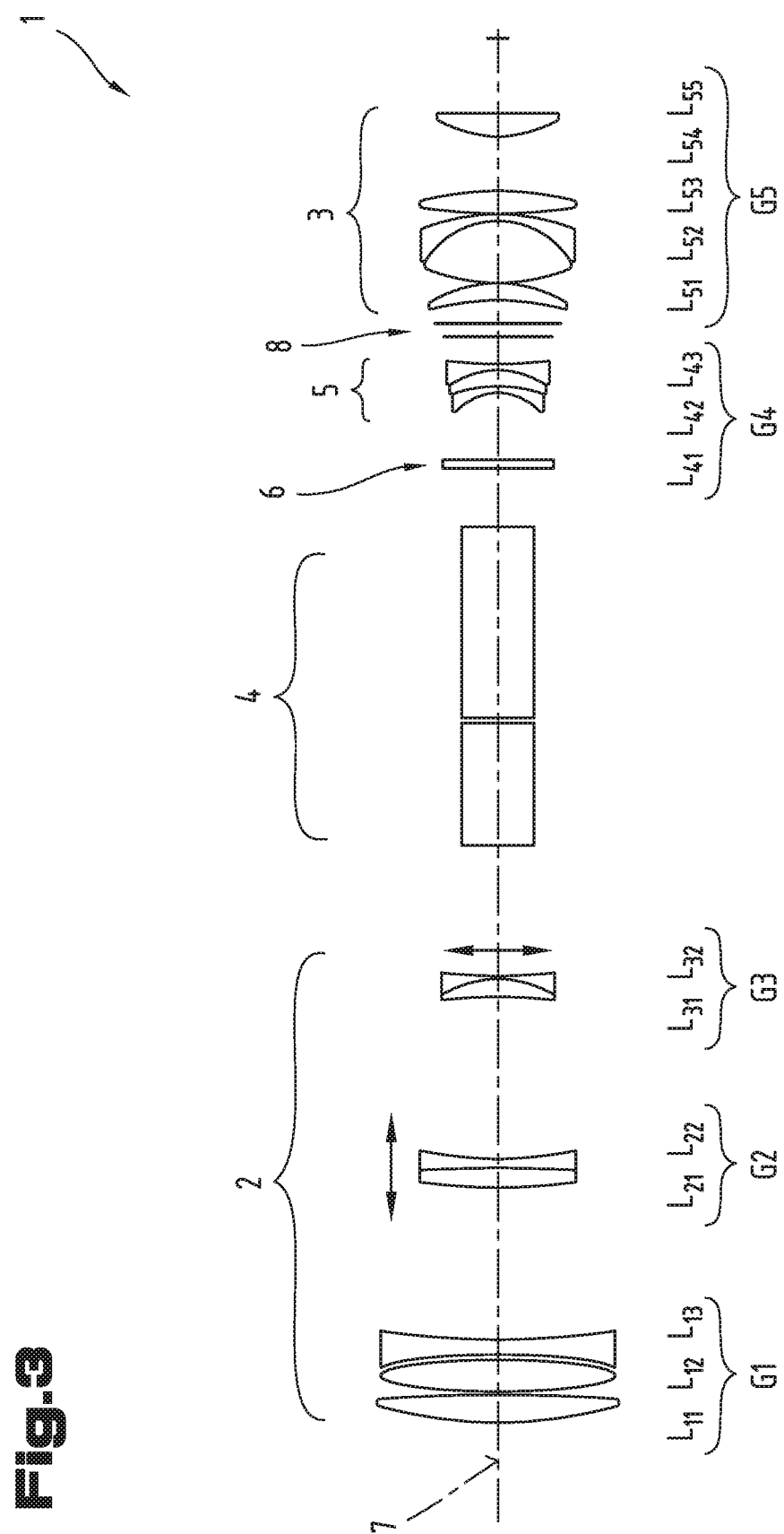
FIG. 3 the telescope optics in an alternative magnification setting.

FIG. 3 shows the telescope optics 1 in an alternative magnification setting. For adjusting the total magnification of the telescope optics 1, the lens group G4 and the lenses L51, L52, L53 and L54 of the lens group G5 are formed to be displaceable in the axial direction of the optical axis 7.

In the position of the lens groups G4 and G5 shown in FIG. 3, the telescope optics 1 has a total magnification of 17.8 times. The data of the optically effective surfaces of the telescope optics 1 in this minimum magnification setting is listed in Table 3 below. In this regard, an angular field of view in object space of 3.42° and an angular field of view in image space of 57.5° are reached. In this regard, the focal length of the eyepiece f' (G5) has a value of f' (G5)=26.07 mm. Thus, the telescope optics 1 has a zoomable magnification setting with a steplessly adjustable magnification between a minimum magnification of 17.8 times and a maximum magnification of 34.3 times.

TABLE 3

| m | r/mm | d/mm | glass |
|---|---|---|---|
| 1 | 97.798 | 6.6 | FCD1 |
| 2 | −381.34 | 0.3 | |
| 3 | 107.37 | 8 | FCD1 |
| 4 | −118.76 | 0.995 | |
| 5 | −115.15 | 3.5 | N-KZFS4 |
| 6 | 185.2 | 35.5 | |
| 7 | 140.35 | 4.3 | N-F2 |
| 8 | −807.26 | 2.5 | N-KZFS4 |
| 9 | 97.628 | 37.5 | |
| 10 | −130.19 | 4.2 | N-LASF40 |
| 11 | −25.109 | 1 | N-LASF44 |
| 12 | 266 | 30 | |
| 13 | infinity | 28.498 | N-BAK4 |
| 14 | infinity | 1 | |
| 15 | infinity | 44.882 | N-BAK4 |
| 16 | infinity | 13.6 | |
| 17 | infinity | 2 | N-BK7 |
| 18 | infinity | 14.538 | |
| 19 | −13.152 | 1.2 | N-FK5 |
| 20* | −33.999 | 0.22 | |
| 21 | −40.287 | 4 | N-SF6 |
| 22 | −19.66 | 1.2 | N-FK5 |
| 23 | 106.35 | 7.05 | |
| 24 | infinity | 5.25 | |
| 25 | −66.05 | 3.9 | N-LAK33 |
| 26 | −32 | 0.3 | |
| 27 | 45.566 | 14.4 | N-PSK3 |
| 28 | −19.793 | 1.2 | N-SF57 |
| 29 | −56.22 | 0.5 | |
| 30 | 111.14 | 5.2 | N-LAK33 |
| 31 | −77 | 16.541 | |
| 32 | 29.78 | 5 | N-SK5 |
| 33 | 445.58 | 18.3 | |

In Table 4, focal lengths of partial systems of the telescope optics 1 according to the first exemplary embodiment are listed.

TABLE 4

| | | f'/mm |
|---|---|---|
| total focal length of objective at minimum magnification | f'(G1, G2, G3, G4)$_{min}$ | 463.23 |
| total focal length of objective at maximum magnification | f'(G1, G2, G3, G4)$_{max}$ | 689.56 |
| focal length of eyepiece at minimum magnification | f'(G5)$_{min}$ | 26.07 |
| focal length of eyepiece at maximum magnification | f'(G5)$_{max}$ | 20.24 |
| focal length of groups G1, G2 | f'(G1, G2) | 164.82 |
| focal length of groups G1, G1, G2 | f'(G1, G2, G3) | 324.44 |

In FIGS. 4 and 5 below, the aberrations of the telescope optics 1 regarding the minimum and the maximum magnification are shown.

FIG. 4 shows diagrams of the different aberrations of the telescope optics 1 at minimum magnification. The diagram "field curvature" shows the field curvature expressed by the deviation in millimeters in the direction of the optical axis 7 (shown on the abscissa) as a function of the object-side visual angle w (shown on the ordinate). In this regard, the deviations for a tangential plane ("T") and a sagittal plane ("S") are shown for each of three wavelengths. The values of the displacements in the direction of the optical axis 7, which can be read on the abscissa, are obtained when a (faultless) paraxial lens is used at the mean interpupillary distance. This paraxial lens focuses the bundle and the human eye is hence simulated. A value of +10 mm is used as focal length of the paraxial lens.

The diagram with the designation "distortion" shows the distortion, i.e. the aberration corresponding to a value of magnification in percent (on the abscissa) that changes as a function of the object-end visual angle w. On the ordinate, the values of the object-end visual angle w can be read.

The diagram designated with "lateral color" shows the "lateral chromatic aberration" (color fringe), wherein again the objective visual angle w is indicated on the ordinate. Lateral deviations in the focusing plane of a paraxial lens arranged at the mean interpupillary distance are shown on the abscissa (with a focal length of +10 mm and a diameter of 5 mm).

The two diagrams designated with "transverse ray fan plot" show the errors of the spherical aberration and/or the aperture aberration. It is indicated on the ordinates (ey and ex) as the value of the transverse displacement in the focal plane of a paraxial lens located behind the eyepiece lens system 3 of the telescope optics 1 at the mean interpupillary distance. The values on the abscissas (Py and Px) correspond to the radial distance of a region in a cross-section of the beam path relative to the optical axis 7.

FIG. 5 shows the different aberrations of the telescope optics 1 at maximum magnification. The diagrams indicate the same variables as described above for FIG. 4. This means that the diagrams show the field curvature, the distortion, the lateral color and/or the chromatic aberration and the aperture aberration of the telescope optics 1 in the magnification setting 34.3 times.

Example 2

In Table 5 below, the data of the individual lenses of a second exemplary embodiment of the telescope optics 1 is listed. The number and designations of the individual lenses and/or lens groups correspond to the representation as shown in FIG. 1. Besides the indications regarding the glass of the individual lenses, the refractive index ne and the Abbe number ve, the values of lens thickness d and the respective focal length f' are stated. Just as in the first exemplary embodiment, the lens group G4 and the lenses L51, L52, L53 and L54 of the lens group G5 are displaceable in the direction of the optical axis 7 and the value of the total magnification of the telescope optics 1 can thereby be changed (FIGS. 1, 3).

The arrangement of the lens surfaces corresponding to the maximum magnification (33.76 times) of the telescope optics 1 is listed in table 6. The respective curvature radius r and the distance to the next following surface d are indicated for every surface number m–m in a count starting at the object-side end of the telescope optics 1.

TABLE 5

|     | ne      | ve    | d/mm | f'/mm    |
|-----|---------|-------|------|----------|
| L11 | 1.49845 | 81.2  | 7.1  | 145.233  |
| L12 | 1.49845 | 81.2  | 9.2  | 93.371   |
| L13 | 1.61664 | 44.27 | 3.5  | −97.227  |
| G1  |         |       |      | 120.999  |

TABLE 5-continued

|     | ne      | ve    | d/mm | f'/mm    |
|-----|---------|-------|------|----------|
| L21 | 1.62408 | 36.16 | 4.3  | 264.566  |
| L22 | 1.61664 | 44.27 | 2.5  | −191.864 |
| G2  |         |       |      | −739.655 |
| L31 | 1.83935 | 37.04 | 4.2  | 29.918   |
| L32 | 1.80832 | 46.25 | 1    | −21.37   |
| G3  |         |       |      | −80.053  |
| L41 | 1.48914 | 70.23 | 1.2  | −34.35   |
| L42 | 1.81266 | 25.16 | 4    | 43.47    |
| L43 | 1.48914 | 70.23 | 1.2  | −33.82   |
| G4  |         |       |      | −27.37   |
| G5  |         |       |      | 20.24    |

The indication of the focal length for the lens group G5 refers to the maximum magnification setting of the telescope optics 1 in this regard.

TABLE 6

| m   | r/mm     | d/mm   | glass    |
|-----|----------|--------|----------|
| 1   | 98.259   | 7.10   | FCD1     |
| 2   | −268.367 | 0.3    |          |
| 3   | 78.962   | 9.2    | FCD1     |
| 4   | −108.957 | 1      |          |
| 5   | −104.062 | 3.5    | N-KZFS4  |
| 6   | 143.262  | 17.6   |          |
| 7   | 170.471  | 4.3    | N-F2     |
| 8   | −5200.05 | 2.5    | N-KZFS4  |
| 9   | 121.087  | 37.5   |          |
| 10  | 168.526  | 4.2    | N-LASF40 |
| 11  | −29.1733 | 1      | N-LASF44 |
| 12  | 42.9948  | 27.748 |          |
| 13  | infinity | 28.498 | N-BAK4   |
| 14  | infinity | 1      |          |
| 15  | infinity | 44.882 | N-BAK4   |
| 16  | infinity | 13.6   |          |
| 17  | infinity | 2      | N-BK7    |
| 18  | infinity | 8.226  |          |
| 19  | −13.152  | 1.2    | N-FK5    |
| 20* | −33.999  | 0.22   |          |
| 21  | −40.287  | 4      | N-SF6    |
| 22  | −19.66   | 1.2    | N-FK5    |
| 23  | 106.35   | 26.45  |          |
| 24  | infinity | 8.2    |          |
| 25  | −66.05   | 3.9    | N-LAK33  |
| 26  | −32      | 0.3    |          |
| 27  | 45.566   | 14.4   | N-PSK3   |
| 28  | −19.793  | 1.2    | N-SF57   |
| 29  | −56.22   | 0.5    |          |
| 30  | 111.14   | 5.2    | N-LAK33  |
| 31  | −77      | 0.5    |          |
| 32  | 29.78    | 5      | N-SK5    |
| 33  | 445.58   | 17.8   |          |

The surface 20, in turn, is an aspherical surface.

Table 7 states the data of the effective surfaces of the lenses of the telescope optics 1 for the minimum magnification setting, i.e. for a magnification of 17.51 times.

TABLE 7

| m  | r/mm     | d/mm  | glass    |
|----|----------|-------|----------|
| 1  | 98.259   | 7.1   | FCD1     |
| 2  | −268.367 | 0.3   |          |
| 3  | 78.962   | 9.2   | FCD1     |
| 4  | −108.957 | 1     |          |
| 5  | −104.062 | 3.5   | N-KZFS4  |
| 6  | 143.262  | 17.58 |          |
| 7  | 170.471  | 4.3   | N-F2     |
| 8  | −5200.05 | 2.5   | N-KZFS4  |
| 9  | 121.087  | 37.52 |          |
| 10 | 168.526  | 4.2   | N-LASF40 |
| 11 | −29.1733 | 1     | N-LASF44 |

TABLE 7-continued

| m | r/mm | d/mm | glass |
|---|------|------|-------|
| 12 | 42.9948 | 27.748 | |
| 13 | infinity | 28.498 | N-BAK4 |
| 14 | infinity | 1 | |
| 15 | infinity | 44.882 | N-BAK4 |
| 16 | infinity | 13.6 | |
| 17 | infinity | 2 | N-BK7 |
| 18 | infinity | 14.538 | |
| 19 | −13.152 | 1.2 | N-FK5 |
| 20* | −33.999 | 0.22 | |
| 21 | −40.287 | 4 | N-SF6 |
| 22 | −19.66 | 1.2 | N-FK5 |
| 23 | 106.35 | 7.05 | |
| 24 | infinity | 5.25 | |
| 25 | −66.05 | 3.9 | N-LAK33 |
| 26 | −32 | 0.3 | |
| 27 | 45.566 | 14.4 | N-PSK3 |
| 28 | −19.793 | 1.2 | N-SF57 |
| 29 | −56.22 | 0.5 | |
| 30 | 111.14 | 5.2 | N-LAK33 |
| 31 | −77 | 16.541 | |
| 32 | 29.78 | 5 | N-SK5 |
| 33 | 445.58 | 18.36 | |

In Table 8, focal lengths and/or total focal lengths of partial systems of the telescope optics 1 are listed.

TABLE 8

| | | f'/mm |
|---|---|---|
| total focal length of objective at minimum magnification | f'(G1, G2, G3, G4) min | 457.2 |
| total focal length of objective at maximum magnification | f'(G1, G2, G3, G4) max | 680.751 |
| focal length of eyepiece at minimum magnification | f'(G5) min | 26.07 |
| focal length of eyepiece at maximum magnification | f'(G5) max | 20.24 |
| focal length of groups G1 + G2 | f'(G1, G2) | 133.561 |
| focal length of groups G1 + G2 + G3 | f'(G1, G2, G3) | 319.378 |

In this second exemplary embodiment of the telescope optics 1, the lens group G3 used for image stabilization has a focal length that is smaller than in the first example. In this case, the focal length of the lens group G3 has a value of f'(G3)=−80.053 mm. In case of tilting of the telescope optics 1 according to this exemplary embodiment, an image stabilization can be achieved by a lateral displacement of the lens group G3 with a value of 4.163 mm/°.

FIGS. 6 and 7 show the aberrations of the telescope optics 1 for the minimum and for the maximum magnification, shown in diagrams for the field curvature, the distortion, the color fringe aberration and the aperture aberration.

Example 3

In Table 9, the data of the lenses and/or lens groups of the telescope optics 1 for a third exemplary embodiment is listed.

The types of glass of the individual lenses and the distances d as well as the curvature radii of the individual optical surfaces for the maximum magnification setting, 33.66 times, are listed in Table 10.

TABLE 9

| | ne | ve | d/mm | f'/mm |
|---|----|----|------|-------|
| L11 | 1.49845 | 81.2 | 5.7 | 192.63 |
| L12 | 1.49845 | 81.2 | 8.8 | 116.144 |
| L13 | 1.61664 | 44.27 | 3.5 | −117.615 |
| G1 | | | | 169.056 |
| L21 | 1.62408 | 36.16 | 4.3 | 174.977 |
| L22 | 1.61664 | 44.27 | 2.5 | −131.781 |
| G2 | | | | −563.417 |
| L31 | 1.83935 | 37.04 | 4.2 | 45.053 |
| L32 | 1.80832 | 46.25 | 1 | −37.239 |
| G3 | | | | −240.006 |
| L41 | 1.48914 | 70.23 | 1.2 | −34.35 |
| L42 | 1.81266 | 25.16 | 4 | 43.47 |
| L43 | 1.48914 | 70.23 | 1.2 | −33.82 |
| G4 | | | | −27.37 |
| G5 | | | | 20.24 |

The indication of the focal length for the lens group G5 refers to the maximum magnification setting of the telescope optics 1 in this regard.

TABLE 10

| m | r/mm | d/mm | glass |
|---|------|------|-------|
| 1 | 134.986 | 5.70 | FCD1 |
| 2 | −327.919 | 0.3 | |
| 3 | 99.622 | 8.8 | FCD1 |
| 4 | −134.1435 | 1 | |
| 5 | −131.4756 | 3.5 | N-KZFS4 |
| 6 | 163.3985 | 38.92 | |
| 7 | 220.395 | 4.3 | N-F2 |
| 8 | −214.816 | 2.5 | N-KZFS4 |
| 9 | 131.285 | 37.5 | |
| 10 | 143.693 | 4.2 | N-LASF40 |
| 11 | −50.6358 | 1 | N-LASF44 |
| 12 | 74.879 | 50.505 | |
| 13 | infinity | 28.498 | N-BAK4 |
| 14 | infinity | 1 | |
| 15 | infinity | 44.882 | N-BAK4 |
| 16 | infinity | 13.6 | |
| 17 | infinity | 2 | N-BK7 |
| 18 | infinity | 8.226 | |
| 19 | −13.152 | 1.2 | N-FK5 |
| 20* | −33.999 | 0.22 | |
| 21 | −40.287 | 4 | N-SF6 |
| 22 | −19.66 | 1.2 | N-FK5 |
| 23 | 106.35 | 26.45 | |
| 24 | infinity | 8.2 | |
| 25 | −66.05 | 3.9 | N-LAK33 |
| 26 | −32 | 0.3 | |
| 27 | 45.566 | 14.4 | N-PSK3 |
| 28 | −19.793 | 1.2 | N-SF57 |
| 29 | −56.22 | 0.5 | |
| 30 | 111.14 | 5.2 | N-LAK33 |
| 31 | −77 | 0.5 | |
| 32 | 29.78 | 5 | N-SK5 |
| 33 | 445.58 | 17.68 | |

The corresponding surface data of the lenses and/or deflecting prisms for the minimum magnification, 17.46 times, is listed in Table 11.

TABLE 11

| m | r/mm | d/mm | glass |
|---|------|------|-------|
| 1 | 134.99 | 5.70 | FCD1 |
| 2 | −327.919 | 0.3 | |
| 3 | 99.622 | 8.8 | FCD1 |
| 4 | −134.1435 | 1 | |
| 5 | −131.4756 | 3.5 | N-KZFS4 |
| 6 | 163.3985 | 38.905 | |
| 7 | 220.395 | 4.3 | N-F2 |
| 8 | −214.816 | 2.5 | N-KZFS4 |

TABLE 11-continued

| m | r/mm | d/mm | glass |
|---|------|------|-------|
| 9 | 131.285 | 37.518 | |
| 10 | 143.693 | 4.2 | N-LASF40 |
| 11 | −50.6358 | 1 | N-LASF44 |
| 12 | 74.879 | 50.505 | |
| 13 | infinity | 28.498 | N-BAK4 |
| 14 | infinity | 1 | |
| 15 | infinity | 44.882 | N-BAK4 |
| 16 | infinity | 13.6 | |
| 17 | infinity | 2 | N-BK7 |
| 18 | infinity | 14.538 | |
| 19 | −13.15 | 1.2 | N-FK5 |
| 20* | −34.00 | 0.22 | |
| 21 | −40.29 | 4 | N-SF6 |
| 22 | −19.66 | 1.2 | N-FK5 |
| 23 | 106.35 | 7.05 | |
| 24 | infinity | 5.25 | |
| 25 | −66.05 | 3.9 | N-LAK33 |
| 26 | −32.00 | 0.3 | |
| 27 | 45.57 | 14.4 | N-PSK3 |
| 28 | −19.79 | 1.2 | N-SF57 |
| 29 | −56.22 | 0.5 | |
| 30 | 111.14 | 5.2 | N-LAK33 |
| 31 | −77.00 | 16.541 | |
| 32 | 29.78 | 5 | N-SK5 |
| 33 | 445.58 | 18.38 | |

Table 12 includes the focal lengths and/or total focal lengths of partial systems of the telescope optics 1.

TABLE 12

| | | f/mm |
|---|---|---|
| total focal length of objective at minimum magnification | $f(G1, G2, G3, G4)_{min}$ | 455.574 |
| total focal length of objective at maximum magnification | $f(G1, G2, G3, G4)_{max}$ | 678.684 |
| focal length of eyepiece at minimum magnification | $f(G5)_{min}$ | 26.07 |
| focal length of eyepiece at maximum magnification | $f(G5)_{max}$ | 20.24 |
| focal length of groups G1 + G2 | f(G1, G2) | 205.854 |
| focal length of groups G1 + G2 + G3 | f(G1, G2, G3) | 318.429 |

In the telescope optics 1 according to this third exemplary embodiment, the magnification can be changed between 17.46 times and 33.66 times. At the minimum magnification, an angular field of view in object space of 3.49° and a corresponding angular field of view in image space of 57.57° are reached. At the maximum magnification, an angular field of view in object space of 2.23° and an angular field of view in image space of 69.64° can be reached.

The image-stabilizing function of the lens group G3 is achieved by a value of 10.546 mm/° lateral displacement of the lens group G3.

FIGS. 8 and 9 show the aberrations of the lens system of the telescope optics 1 according to this third exemplary embodiment, represented in diagrams for the field curvature, the distortion, the color fringe aberration and the aperture aberration.

Example 4

By means of FIG. 10, a fourth exemplary embodiment is described. The representation shows the entire lens system of the telescope optics 1. Therein, for the formation of the lens group G3 it is provided for that it comprises a third individual lens, namely the lens referred to as L33. Lens L33 is preferably formed by a biconvex lens, i.e. a lens with a positive refractive power. It is also arranged to be fixed in the beam path and/or lens system of telescope optics 1. As opposed to the exemplary embodiments described above, now the negative refractive power of the partial lens group of G3 formed by the lenses L31 and L32 can now be formed with a (quantitatively) higher refractive power, whereby the extent of the maximum possible deflection range is increased. Thus, in total, an even higher image-stabilizing effect is achieved. The partial lens group of G3 formed by the lenses L31 and L32 is laterally displaceable and preferably comprises a focal length of f'(L31, L32)=−51.2 mm.

Moreover, it is provided for in the objective lens system 2 of this exemplary embodiment that the lenses L12 and L13 of the first lens group G1 are formed by a cemented component. A cemented component is also used in the second lens group G2 of the objective lens system 2. Both lenses, the lens L21 and the lens L22, are formed by a convexo-concave lens.

In Table 15, the data of the lenses and/or lens groups of the telescope optics 1 for this fourth exemplary embodiment is listed.

The types of glass of the individual lenses and the distances d as well as the curvature radii of the individual optical surfaces for the maximum magnification setting, 39.51 times, are listed in Table 16.

TABLE 15

| | ne | ve | d/mm | f'/mm |
|---|---|---|---|---|
| L11 | 1.49845 | 81.2 | 6.2 | 186.424 |
| L12 | 1.49845 | 81.2 | 8.9 | 111.081 |
| L13 | 1.65569 | 44.67 | 3.5 | −115.54 |
| G1 | | | | 158.084 |
| L21 | 1.65222 | 33.56 | 2.7 | 428.627 |
| L22 | 1.62068 | 49.54 | 2.5 | 1250.23 |
| G2 | | | | −636.614 |
| L33 | 1.49845 | 81.2 | 3.1 | 106.791 |
| L31 | 1.62408 | 36.16 | 4.4 | 33.286 |
| L32 | 1.62068 | 49.54 | 1 | −19.981 |
| G3 | | | | −125.6 |
| L41 | 1.81266 | 25.16 | 4.6 | 57.876 |
| L42 | 1.48914 | 70.23 | 1 | −29.389 |
| L43 | 1.79195 | 47.25 | 7 | 54.177 |
| G4 | | | | −19.779 |
| G5 | | | | 21.707 |

The indication of the focal length for the lens group G5 refers to the maximum magnification setting of the telescope optics 1 in this regard.

TABLE 16

| m | r/mm | d/mm | glass |
|---|------|------|-------|
| 1 | 142.8 | 6.2 | FCD1 |
| 2 | −262.2 | 0.3 | |
| 3 | 82.538 | 8.9 | FCD1 |
| 4 | −162.17 | 3.5 | N-BAF51 |
| 5 | 143.39 | 33.5 | |
| 6 | 205.8 | 2.7 | N-SF2 |
| 7 | 775.99 | 2.5 | N-SSK8 |
| 8 | 130.75 | 42.5 | |
| 9 | 64.59 | 3.1 | FCD1 |
| 10 | −297.82 | 7 | |
| 11 | 1060.73 | 4.4 | N-F2 |
| 12 | −21.154 | 1 | N-SSK8 |
| 13 | 30.517 | 10 | |
| 14 | infinity | 32.321 | N-BAK4 |
| 15 | infinity | 1.8 | |
| 16 | infinity | 56.528 | N-BAK4 |
| 17 | infinity | 5 | |
| 18 | infinity | 2 | N-BK7 |

TABLE 16-continued

| m | r/mm | d/mm | glass |
|---|------|------|-------|
| 19 | infinity | 9.01 | |
| 20* | −13.152 | 1.2 | S-FPL51 * |
| 21 | −39 | 4.2 | |
| 22 | −19.692 | 4.6 | N-SF6 |
| 23 | −15.334 | 1 | N-FK5 |
| 24 | 234.9 | 26.599 | |
| 25 | infinity | 8.85 | |
| 26 | −342.64 | 7 | N-LAF21 |
| 27 | −38.475 | 0.3 | |
| 28 | 132.87 | 14.5 | N-SK5 |
| 29 | −22.593 | 1.2 | E-FDS1 |
| 30 | −67.277 | 0.3 | |
| 31 | 74.127 | 7.7 | N-LAK33A |
| 32 | −77.338 | 0.5 | |
| 33 | 29.28 | 4.8 | N-SK5 |
| 34 | 99.06 | 18.56 | |
| 35 | eye | | |

The corresponding surface data of the lenses and/or deflecting prisms for the minimum magnification, 16.52 times, is listed in Table 17.

TABLE 17

| m | r/mm | d/mm | glass |
|---|------|------|-------|
| 1 | 142.8 | 6.2 | FCD1 |
| 2 | −262.2 | 0.3 | |
| 3 | 82.538 | 8.9 | FCD1 |
| 4 | −162.17 | 3.5 | N-BAF51 |
| 5 | 143.39 | 33.5 | |
| 6 | 205.8 | 2.7 | N-SF2 |
| 7 | 775.99 | 2.5 | N-SSK8 |
| 8 | 130.75 | 42.5 | |
| 9 | 64.59 | 3.1 | FCD1 |
| 10 | −297.82 | 7 | |
| 11 | 1060.73 | 4.4 | N-F2 |
| 12 | −21.154 | 1 | N-SSK8 |
| 13 | 30.517 | 10 | |
| 14 | infinity | 32.321 | N-BAK4 |
| 15 | infinity | 1.8 | |
| 16 | infinity | 56.528 | N-BAK4 |
| 17 | infinity | 5 | |
| 18 | infinity | 2 | N-BK7 |
| 19 | infinity | 14.688 | |
| 20* | −13.152 | 1.2 | S-FPL51 * |
| 21 | −39 | 4.2 | |
| 22 | −19.692 | 4.6 | N-SF6 |
| 23 | −15.334 | 1 | N-FK5 |
| 24 | 234.9 | 7.731 | |
| 25 | infinity | 0.55 | |
| 26 | −342.64 | 7 | N-LAF21 |
| 27 | −38.475 | 0.3 | |
| 28 | 132.87 | 14.5 | N-SK5 |
| 29 | −22.593 | 1.2 | E-FDS1 |
| 30 | −67.277 | 0.3 | |
| 31 | 74.127 | 7.7 | N-LAK33A |
| 32 | −77.338 | 21.988 | |
| 33 | 29.28 | 4.8 | N-SK5 |
| | 99.06 | 19.96 | |
| | eye | | |

Table 18 includes the focal lengths and/or total focal lengths of partial systems of the telescope optics 1.

TABLE 18

| | | f/mm |
|---|---|------|
| total focal length of objective at minimum magnification | f'(G1, G2, G3, G4)$_{min}$ | 480.949 |
| total focal length of objective at maximum magnification | f'(G1, G2, G3, G4)$_{max}$ | 866.157 |
| focal length of eyepiece at minimum magnification | f'(G5)min | 28.8 |
| focal length of eyepiece at maximum magnification | f'(G5)max | 21.707 |
| focal length of groups G1 + G2 | f'(G1, G2) | 186.954 |
| focal length of groups G1 + G2 + G3 | f'(G1, G2, G3) | 310.344 |

In the telescope optics 1 according to this fourth exemplary embodiment, the magnification can be changed between 16.52 times and 39.51 times. At the minimum magnification, an angular field of view in object space of 3.53° and a corresponding angular field of view in image space of 56.9° are reached. At the maximum magnification, an angular field of view in object space of 1.94° and an angular field of view in image space of 70.8° can be reached.

The image-stabilizing function of the lens group comprising the two lenses L31, L32 is achieved by a value of the specific lateral displacement of 2.888 mm/°.

In addition, it can be added that the reflections of the light beams on the surfaces of the prism erecting system 4 partly contribute to the image-stabilizing effect. This is due to the fact that pivoting of a light beam reflected on a surface results in doubling of the deflection angle in relation to the pivoting angle. FIGS. 1, 3 and 10, in a simplified manner, show the beam paths in unfolded manner. However, in fact, the effect by the reflections must be taken into consideration as well. The lateral displacement of the lens group G3 and/or the two lenses L31, L32 (in the fourth exemplary embodiment) required for achieving image stabilization can thus be smaller than would be necessary without the reflecting effect of the prisms.

Table 13 contains a list and/or comparison of the focal lengths of the lens group G3 and the values of the specific lateral displacement for image stabilization for the described examples of the telescope optics 1. In this regard, examples 1 to 3 are listed in ascending order of the amount of the focal length of the lens group G3, f'(G3). The fourth column of the table shows the values of the ratio of specific lateral displacement for image stabilization to the focal length of the lens group G3, c(G3) and/or the laterally displaceable lens group L31, L32. The fifth column lastly contains the values of the ratio of the focal length of the first lens group G1 to the focal length of the second lens group G2, f'(G1)/f'(G2).

TABLE 13

| example | f'(G3) [mm] | specific displacement [mm/°] | c(G3) [10$^{-3}$/°] | f'(G1)/ f'(G2) |
|---------|-------------|------------------------------|---------------------|----------------|
| 2 | −80.053 | 4.163 | −52.0 | −0.164 |
| 1 | −120.7 | 6.02 | −49.9 | −0.249 |
| 3 | −240.006 | 10.546 | −43.9 | −0.300 |
| 4 | f'(L31, L32) [mm] −51.2 | spec. displacement of the group L31, L32 [mm/°] 1.39 | −27.1 | −0.248 |

A telescope optics 1, the value of the ratio of the specific lateral displacement for image stabilization to the focal length of the lens group G3 and/or the laterally displaceable lens group L31, L32 (in the fourth exemplary embodiment) of which is in a range between −52×10−3/° and −25×10−3/°, proves to be particularly advantageous. Moreover, it proves to be favorable if a ratio of the focal length of the first lens group G1 to the focal length of the second lens group G2 is in a range between −0.30 to −0.16.

Further characteristic ratios of focal lengths of the objective lens system 2 can be gathered from Table 14. In this regard, the examples are again listed in ascending order of the amount of the focal length of the lens group G3 (second column). The third column contains the total length of the telescope optics 1, i.e. the respective value of the sum of all distances "d" of successive surfaces m=1 to m=32 (e.g. Table 1, third column). The fourth column shows the respective values of the ratios of the focal length of the first lens group G1 to the focal length of the third lens group G3. The fifth column contains the values of the ratio of the focal length of the second lens group G2 to the focal length of the third lens group G3. Lastly, the sixth column shows the values of the ratios of the focal length of the third lens group G3 to the total focal length of the lens system formed by the first lens group G1 and the second lens group G2.

TABLE 14

| example | f'(G3) [mm] | total length [mm] | f'(G1)/ f'(G3) | f'(G2)/ f'(G3) | f'(G3)/ f'(G1, G2) |
|---|---|---|---|---|---|
| 2 | −80.053 | 286.42 | −1.511 | 9.240 | −0.599 |
| 1 | −120.7 | 304.87 | −1.186 | 4.754 | −0.732 |
| 3 | −240.006 | 328.70 | −0.704 | 2.348 | −1.166 |
| 4 | −125.6 | 333.57 | −1.259 | 5.069 | −0.670 |

Users usually prefer telescopes with a shorter overall length. Consequently, telescope optics 1 with focal lengths and/or with ratios of focal lengths of the first lens group G1 to the third lens group G3 in a range between −1.511 and −0.704 and with ratios of focal lengths of the second lens group G2 to the third lens group G3 in a range between 2.348 and 9.240, have proven to be advantageous. I.e. if the conditions −1.511<f'(G1)/f'(G3)<−0.704 and 2.348<f'(G2)/f'(G3)<9.240 are met. Preferably, this telescope optics 1 is built with focal lengths f'(G1), f'(G2) and f'(G3) fulfilling the conditions −1.5<f'(G1)/f'(G3)<−1.2 and 5<f'(G2)/f'(G3)<9.

The exemplary embodiments show possible embodiment variants, and it should be noted in this respect that the invention is not restricted to these particular illustrated embodiment variants of it, but that rather also various combinations of the individual embodiment variants are possible and that this possibility of variation owing to the teaching for technical action provided by the present invention lies within the ability of the person skilled in the art in this technical field.

The scope of protection is determined by the claims. However, the description and the drawings are to be adduced for construing the claims. Individual features or feature combinations from the different exemplary embodiments shown and described may represent independent inventive solutions. The object underlying the independent inventive solutions may be gathered from the description.

All indications regarding ranges of values in the present description are to be understood such that these also comprise random and all partial ranges from it, for example, the indication 1 to 10 is to be understood such that it comprises all partial ranges based on the lower limit 1 and the upper limit 10, i.e. all partial ranges start with a lower limit of 1 or larger and end with an upper limit of 10 or less, for example 1 through 1.7, or 3.2 through 8.1, or 5.5 through 10.

Finally, as a matter of form, it should be noted that for ease of understanding of the structure, elements are partially not depicted to scale and/or are enlarged and/or are reduced in size.

The invention claimed is:

1. A telescope optics for a telescopic observational instrument having an objective lens system, having a prism erecting system and having an eyepiece lens system, wherein an image of an object generated by the objective lens system is located between the prism erecting system and the eyepiece lens system, and wherein the objective lens system, in an order starting from the object side, comprises a first lens group G1 with a positive refractive power, a second lens group G2 with a negative refractive power and a third lens group G3 with at least one lens having a negative refractive power, and wherein the second lens group G2 is adjustable in parallel to an optical axis for focusing, and wherein at least one lens with a negative refractive power of the third lens group G3 is adjustable perpendicularly to the optical axis for changing the position of the image, wherein the third lens group G3 has a negative refractive power, wherein the focal length of the first lens group f'(G1), the focal length of the second lens group f'(G2) and the focal length of the third lens group f'(G3) fulfill the conditions −1.511<f'(G1)/f'(G3)<−0.704 and 2.348<f'(G2)/f'(G3)<9.240.

2. The telescope optics according to claim 1, wherein the value of a ratio of a specific lateral displacement of the at least one lens with a negative refractive power of the third lens group G3 for image stabilization to a focal length of the third lens group G3 is in a range of between −52×10$^{-3}$/° and −25×10$^{-3}$/°, wherein the specific lateral displacement of the at least one lens with a negative refractive power of the third lens group G3 for image stabilization is defined by the lateral displacement, of the at least one lens with a negative refractive power of the third lens group G3 required to achieve an image tabilization in case of a tilt of the optical axis about an angle of one degree.

3. The telescope optics according to claim 1, wherein a ratio of a focal length of the first lens group G1 to a focal length of the second lens group G2 has a value in a range of between −0.30 and −0.16 (−0.30<f'(G1)/f'(G2)<−0.16).

4. The telescope optics according to claim 1, wherein a ratio of a focal length of the third lens group G3 to the focal length of the lens system formed of the first lens group G1 and the second lens group G2 has a value in a range between −1.17 and −0.60 (−1.17<f'(G3)/f'(G1, G2)<−0.60).

5. The telescope optics according to claim 1, wherein the first lens group G1 of the objective lens system, in an order starting from the object side, comprises a first lens L11 with a positive refractive power, a second lens L12 with a positive refractive power and a third Lens L13 with a negative refractive power.

6. The telescope optics according to claim 1, wherein the first lens group G1 of the objective lens system, in an order starting from the object side, comprises a biconvex lens L11, a biconvex lens L12 and a biconcave lens L13.

7. The telescope optics according to claim 6, wherein the lenses L12 and L13 of the first lens group G1 of the objective lens system form a cemented component.

8. The telescope optics according to claim 1, wherein the second lens group G2 of the objective lens system comprises a convex surface in the direction of the objective and a concave surface in the direction of the eyepiece.

9. The telescope optics according to claim 1, wherein the second lens group G2 of the objective lens system, in an order starting from the object side, comprises a cemented component with a biconvex lens L21 and with biconcave lens L22.

10. The telescope optics according to claim 1, wherein the second lens group G2 of the objective lens system, in an order starting from the object side, comprises a cemented component with a convexo-concave lens L21 and with a convexo-concave lens L22.

11. The telescope optics according to claim 1, wherein the at least one lens with a negative refractive power of the third lens group G3 of the objective lens system, in an order starting from the object side, is formed as a cemented component with a concavo-convex lens L31 and a biconcave lens L32.

12. The telescope optics according to claim 11, wherein the third lens group G3 of the objective lens system, in an order starting from the object side, comprises a lens L33 with a positive refractive power, preferably formed as a biconvex lens, and the cemented component with a negative refractive power.

13. The telescope optics according to claim 1, wherein a field lens is formed as a fourth lens group G4, wherein the fourth lens group G4, in an order starting from the object side, comprises a concavo-convex lens L41 and a cemented component of a concavo-convex lens L42 and a biconcave lens L43.

14. The telescope optics according to claim 13, wherein the eyepiece lens system comprises a fifth lens group G5, wherein the fifth lens group G5, in an order starting from the object side, comprises a concavo-convex lens L51, a cemented component of a biconvex lens L52 and concavo-convex lens L53, a biconvex lens L54 and a convexo-concave lens L55.

15. The telescope optics according to claim 14, wherein the lens group G4 and the lenses L51, L52, L53 and L54 of the fifth lens group G5 are formed to be displaceable in the axial direction according to the optical axis.

16. A telescope optics for a telescopic observational instrument having an objective lens system, having a prism erecting system and having an eyepiece lens system, wherein an image of an object generated by the objective lens system is located between the prism erecting system and the eyepiece lens system, and wherein the objective lens system, in an order starting from the object side, comprises a first lens group G1 with a positive refractive power, a second lens group G2 with a negative refractive power and a third lens group G3 with at least one lens having a negative refractive power, and wherein the second lens group G2 is adjustable in parallel to an optical axis for focusing, and wherein at least one lens with a negative refractive power of the third lens group G3 is adjustable perpendicularly to the optical axis for changing the position of the image, wherein the third lens group G3 has a negative refractive power, wherein a ratio of a focal length of the third lens group G3 to the focal length of the lens system formed of the first lens group G1 and the second lens group G2 has a value in a range between −1.17 and −0.60 (−1.17<f'(G3)/f'(G1,G2)<−0.60).

17. A telescope optics for a telescopic observational instrument having an objective lens system, having a prism erecting system and having an eyepiece lens system, wherein an image of an object generated by the objective lens system is located between the prism erecting system and the eyepiece lens system, and wherein the objective lens system, in an order starting from the object side, comprises a first lens group G1 with a positive refractive power, a second lens group G2 with a negative refractive power and a third lens group G3 with at least one lens having a negative refractive power, and wherein the second lens group G2 is adjustable in parallel to an optical axis for focusing, and wherein at least one lens with a negative refractive power of the third lens group G3 is adjustable perpendicularly to the optical axis for changing the position of the image, wherein the third lens group G3 has a negative refractive power, wherein the second lens group G2 of the objective lens system, in an order starting from the object side, comprises a cemented component with a convexo-concave lens L21 and with a convexo-concave lens L22.

18. A telescope optics for a telescopic observational instrument having an objective lens system, having a prism erecting system and having an eyepiece lens system, wherein an image of an object generated by the objective lens system is located between the prism erecting system and the eyepiece lens system, and wherein the objective lens system, in an order starting from the object side, comprises a first lens group G1 with a positive refractive power, a second lens group G2 with a negative refractive power and a third lens group G3 with at least one lens having a negative refractive power, and wherein the second lens group G2 is adjustable in parallel to an optical axis for focusing, and wherein at least one lens with a negative refractive power of the third lens group G3 is adjustable perpendicularly to the optical axis for changing the position of the image, wherein the third lens group G3 has a negative refractive power, wherein the at least one lens with a negative refractive power of the third lens group G3 of the objective lens system, in an order starting from the object side, is formed as a cemented component with a concavo-convex lens L31 and a biconcave lens L32.

19. A telescope optics for a telescopic observational instrument having an objective lens system, having a prism erecting system and having an eyepiece lens system, wherein an image of an object generated by the objective lens system is located between the prism erecting system and the eyepiece lens system, and wherein the objective lens system, in an order starting from the object side, comprises a first lens group G1 with a positive refractive power, a second lens group G2 with a negative refractive power and a third lens group G3 with at least one lens having a negative refractive power, and wherein the second lens group G2 is adjustable in parallel to an optical axis for focusing, and wherein at least one lens with a negative refractive power of the third lens group G3 is adjustable perpendicularly to the optical axis for changing the position of the image, wherein the third lens group G3 has a negative refractive power, wherein a field lens is formed as a fourth lens group G4, wherein the fourth lens group G4, in an order starting from the object side, comprises a concavo-convex lens L41 and a cemented component of a concavo-convex lens L42 and a biconcave lens L43.

20. A telescope optics for a telescopic observational instrument having an objective lens system, having a prism erecting system and having an eyepiece lens system, wherein an image of an object generated by the objective lens system is located between the prism erecting system and the eyepiece lens system, and wherein the objective lens system, in an order starting from the object side, comprises a first lens group G1 with a positive refractive power, a second lens group G2 with a negative refractive power and a third lens group G3 with at least one lens having a negative refractive power, and wherein the second lens group G2 is adjustable in parallel to an optical axis for focusing, and wherein at least one lens with a negative refractive power of the third lens group G3 is adjustable perpendicularly to the optical axis for changing the position of the image, wherein the third lens group G3 has a negative refractive power, wherein the eyepiece lens system comprises a fifth lens group G5, wherein the fifth lens group G5, in an order starting from the object side, comprises a concavo-convex lens L51, a cemented component of a biconvex lens L52 and concavo-convex lens L53, a biconvex lens L54 and a convexo-concave lens L55.

* * * * *